United States Patent [19]

Hager et al.

[11] Patent Number: 5,373,058

[45] Date of Patent: Dec. 13, 1994

[54] UNSATURATED POLYESTER RESIN COMPOSITIONS

[75] Inventors: William G. Hager, Reynoldsburg; Timothy W. Ramey, Chillicothe; Paul R. Krumlauf, Thornville; Jay J. Beckman, Newark, all of Ohio

[73] Assignee: Owens-Corning Fiberglas Technology Inc., Summit, Ill.

[21] Appl. No.: 19,007

[22] Filed: Feb. 18, 1993

[51] Int. Cl.$^5$ .................. C08F 8/00; C08L 67/06
[52] U.S. Cl. ...................... 525/168; 528/272; 528/296; 528/300; 528/302; 528/303; 528/306; 528/307; 528/308; 528/308.6; 525/43; 525/44; 525/437; 525/445

[58] Field of Search ............... 528/272, 296, 300, 302, 528/303, 306, 307, 308, 308.6; 525/437, 445, 168, 43, 44

[56] References Cited

U.S. PATENT DOCUMENTS 4,948,821  8/1990  De Koning et al. ............... 523/500

Primary Examiner—Samuel A. Acquah
Attorney, Agent, or Firm—Ted C. Gillespie; Patrick P. Pacella

[57] ABSTRACT

This development provides glycidyl-acrylates that, when copolymerized with unsaturated polyesters, provide high performance, structural SMC products. The acrylates increase the reactivity of the polyesters. One result has been "zero shrinkage" parts with good heat distortion, pigmentability and excellent mechanical and physical properties.

15 Claims, No Drawings

UNSATURATED POLYESTER RESIN COMPOSITIONS

TECHNICAL FIELD

This development relates to unsaturated polyester resin compositions. This development also relates to using these compositions for structured applications in the automotive industry.

BACKGROUND ART

Unsaturated polyester resins compositions are well known in the industry. The compositions often include ethylenically unsaturated monomers such as styrene. The monomers copolymerize with the unsaturated polyester to cross-link the composition. The compositions also contain "low profile additives" (LPA's). The LPA's are thermoplastic polymers that act to prevent undesirable shrinkage as the composition is being molded into a thermoset article.

The composition also may contain a fourth component known as a compatible component. The compatible component does not react with the unsaturated polyester, and improves surface quality and mold flowability. The four component resinous system imparts improved surface smoothness when used with other known, conventional ingredients for low-profile resin systems used in making sheet molding compounds (SMC).

New applications for polyesters have arisen in which the resins would be required to function in high temperature/corrosive environments. These encompass automotive structural resins (under-the-hood with exposure to hot oil, radiator fluid, etc. at high temperature). They also include resins for FDA approval able to withstand high temperature and repeated exposure to alkaline media. Heat distortion temperature (HDT) determines the upper service temperature of a part. Because high temperatures are commonly encountered under-the-hood, high HDT is a prerequisite for these new applications.

A common problem with polyester resins used in structural applications is that significant shrinkage occurs during cure. This causes serious problems since even small amounts of shrinkage cause bolt holes to miss-align, cross-members to warp, etc. Consequently, a so-called "zero-shrink" requirement for structural resins has become necessary to ensure dimensional stability. Including the appropriate amount of thermoplastic in an SMC formulation prevents excessive shrinkage and has been used for many years in the industry. Unfortunately, to reach the so-called "zero shrink" requirement, so much thermoplastic must be employed that unacceptably low HDT results. This fact sharply limits the use of polyester and vinyl ester-based resins in under-the-hood applications.

DISCLOSURE OF INVENTION

We have discovered that certain glycidyl acrylates, when copolymerized with certain unsaturated polyesters, provide high performance, structural SMC products. The acrylates increase the reactivity of the polyesters. One result has been "zero shrinkage" parts with good heat distortion, pigmentability and excellent mechanical and physical properties.

We have solved this dilemma by modifying the polyesters with glycidyl-acrylates which increases the unsaturation of the polyesters. The glycidyl-acrylates react with residual acid on the polyester molecule. The increased unsaturation gives higher reactivity, which in turn leads to higher HDT and better corrosion resistance.

The glycidyl-acrylate allows for the use of more thermoplastic (LPA's) in an SMC formulation. We have developed a polyester that reaches the "zero-shrink" requirement yet retains good high temperature performance.

BEST MODE OF CARRYING OUT INVENTION

The resin composition we developed comprises:

(a) an unsaturated polyester comprising a polycondensation of dihydric alcohols and ethylenically unsaturated polycarboxylic acids; and (b) glycidyl-acrylates which react with residual acid in the unsaturated polyester.

The glycidyl acrylates of this invention are represented by the formula

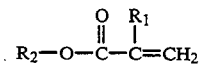

wherein $R_1$, is hydrogen or an alkyl radical having 1 to 5 carbon atoms, and $R_2$ is a glycidyl ester group having the formula

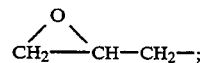

or

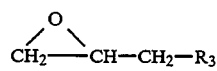

wherein $R_3$ ranges from $C_2H_2O_4-$ to $C_{10}H_8O_4-$. Generally $R_3$ is oxalate, malonate, succinate, glutamate, adipate, maleate, phthalate, and the like.

Generally, the glycidyl acrylates have the composition wherein:

$R_1$ is hydrogen or an alkyl radical having 1 to 5 carbon atoms;

$R_2$ is $C_3H_5O-$ to $C_{13}H_{13}O_5-$ $R_3$ is $C_2H_2O_4-$ to $C_{10}H_8O_4-$

Preferred glycidly acrylates have the composition wherein:

$R_1$ is hydrogen or an alkyl radical having 1 to 3 carbon atoms;

$R_2$ is $C_3H_5O-$ to $C_9H_{11}O_5$ $R_3$ is $C_2H_2O_4-$ to $C_6H_6O_4-$

Most preferred by the glycidly acrylates have the composition wherein:

$R_1$ is hydrogen or a methyl radical; and $R_2$ is $C_3H_5O-$

A preferred epoxide-acrylate is glycidyl methacrylate (GMA).

In addition, the composition may include:

(c) one or more ethylenically unsaturated monomers which copolymerize with the unsaturated polyester;

(d) one or more low-profile thermoplastic polymers which cause phase separation and porosity during a curing reaction, or (e) one or more compatible components which are compatible with the reacted unsaturated polyester and monomer during cure.

The unsaturated polyester component comprises the polycondensation reaction product of one or more polyhydric alcohols and one or more ethylenically unsaturated polycarboxylic acids. By polycarboxylic acid is generally meant the polycarboxlyic or dicarboxylic acids or anhydrides, polycarboxylic or dicarboxylic acid halides, and polycarboxylic or dicarboxylic esters. Suitable unsaturated polycarboxylic acids, and the corresponding anhydrides and acid halides that contain polymerizable carbon-to-carbon double bonds may include maleic anhydride, maleic acid, and fumaric acid. A minor proportion of the unsaturated acid, up to about forty mole percent, may be replaced by dicarboxylic or polycarboxylic acid that does not contain a polymerizable carbon-to-carbon bond. Examples of which include O-phthalic, isophthalic, terephthalic, succinic, adipic, sebacic, methyl-succinic, trimellitic anhydride and the like.

Polyhydric alcohols that are useful in preparing the polyesters include 1,2-propane diol (hereinafter referred to as propylene glycol), dipropylene glycol, diethylene glycol, 1,3-butanediol, ethylene glycol, glycerol, and the like.

The polyhydric alcohols include diols, triols, tetrols and higher functionality alcohols. The may be represented by the formula $R(OH)_x$ wherein R is an alkyl radical having 2 to 10 carbon atoms and X is an integer from 2 to 4. Preferably, we employ dihydric alcohols with alkyl groups having 2 to 5 carbon atoms.

We also prefer glycols chosen from a group of high performance glycols including neopentyl glycol (NPG), 1,4-cyclohexanedimethanol (CHDM), 2,2,4-trimethylpantane-1-3-pentanediol (TMPD), and 2-methyl-1,3-propanediol (MPD). We prepared the polyesters with maleic anhydride and occasionally isophthalic acid. We also stop the condensation at an unusually high acid value (50–70 mg KOH/g resin rather than the conventional 10–30 mg KOH/g resin). Acrylate modification then was carried out.

Our reaction requires two steps and forms true polymer. We react one or more polybasic acids and one or more polyhydridic alcohols first to form a polyester polymer in a molar ratio of about 1:1. In the second step (post polymerization functionalization), the residual acid groups of the polymer are reacted with the epoxy group of the acrylate with a ratio of polybasic acid to acrylates of about 2–10:1. In this way, acrylate is incorporated into our product. In summary, we use the epoxide/acid reaction to attach acrylate to a polymer.

The monomer component of the resinous system comprises materials that copolymerize with the unsaturated polyester. The ethylenically unsaturated monomer that is copolymerizible with the unsaturated polyester is most generally styrene, however, methylstyrene is also useful, as are acrylates and methacrylates such as methyl-acrylates, ethyl-acrylate, methyl-methacrylate, ethyl methacrylate, etc.

The low-profile additive component of resinous system comprises the thermoplastic polymers which cause phase separation and porosity during the curing reaction. Low-profile additives are materials that when mixed in an unsaturated polyester and cured, result in a multiphase system. Some polymers that are useful as low-profile additives include homopolymers and copolymers of acrylic and methacrylic acid esters, cellulose acetate butyrate, vinyl acetate homopolymers and copolymers, polyurethanes prepared from polyisocyanates, preferably diisocyanates, and polyether polyols, numerous saturated polyesters, polycaprolactone, styrene-butadiene copolymers, some modified celluloses, and certain alkyl oxide polymers. The above list of low-profile additives is not intended to list all low-profile additives but rather to show examples of materials which have been used to cause the multiphase morphology present in low profile resins.

The compatible component of resinous system comprises one or more materials which are compatible with the reacted unsaturated polyester and monomer during cure. The compatible component, when added to the unsaturated polyester/monomer combination does not cause the necessary microphase separation that occurs with low profile systems; that is, the compatible component does not act like a low-profile additive. Examples of other useful compatible components are those compatible components containing one or more polyoxyethane substituents, as disclosed in U.S. Pat. No. 5,089,544. These examples are intended to be illustrative of suitable compatible components and are not intended to be all inclusive.

INDUSTRIAL APPLICABILITY

EXAMPLE I

To a four liter reactor fitted for polyester synthesis, we loaded 1164 g propylene glycol, 350 g isophthalic acid, 1168 g maleic anhydride and 0.95 g of 10% solution of toluhydroquinone THQ. We heated the reactor to 200° C. or until the acid value reaches 30–35 mg KOH/g resin. We then cool reactor to 150° C.

To the molten polyester at 150° C. we added 1 g 2,6-di-tert-4-methylphenol (BMT), 0.005 g 1,4-benzoquinone (PBQ), 2.57 g N,N-dimethylbenzylamine (DMBA). We then dropwise added 176 g glycidyl methacrylate to an end point acid value of 11 mg KOH/g resin. We then dissolve resin in about 1700 g styrene inhibited with BHA PBQ and THQ. BHA is 3,5-Di-tert-Butyl-4-Hydroxyanisole.

EXAMPLE II

We loaded a four liter reactor as in Example I with 1015 g 2-methyl-1,3-propanediol, 5.05g piperidine, 431 g ethylene glycol, 616 g phthalic anhydride, 1210 g maleic anhydride and 124 g of 10% solution of toluhydroquinone. We heated to 200° C. or until the acid value had an end point of 52 mg KOH/g resin. We cooled the reactor to 150° C., added 0.9 g BHT, 0.05 g PBQ, 3.20 g DMBA and 196 g GMA to an end point acid value of 31 mg KOH/g resin. We then thinned the resin in styrene, as in Example I.

EXAMPLE III

The following table shows a typical SMC formulation.

| Typical Sheet Molding Compound Formulation | |
| --- | --- |
| Ingredients | Amount |
| Resin of Ex I or II | 100 |
| Catalyst | 1.4 |
| Release agent | 4.2 |
| Filler | 215 |
| Thickener | 3.7 |
| Pigment | 0.2 |
| Carrier | 1.9 |
| Secondary monomer | 3.7 |

Compression molded parts were made with each formulation with 27 percent, by weight, of 2.54 cm chopped glass fibers. Typical parts include valve covers, cowl vents, radiator supports and the like. Tests found these parts to have high heat distortion temperatures, zero shrinkage and have the ability to withstand repeated exposure to alkaline media.

A further advantage of using these new resins is that dark black pigmentation of zero-shrink systems is now possible. Formerly, zero-shrink systems gave only light pastel pigmentation at best. Now, because of higher reactivity, special additives which normally reduce HDT to unacceptable levels can be used that will allow very good pigmentation.

EXAMPLE IV 36 kg Batch

| First Stage | |
|---|---|
| Ingredients | Amount |
| 2-methyl-1,3-propanediol | 9.83 kg |
| Ethylene glycol | 4.47 kg |
| Phthalic anhydride | 6.40 kg |
| Maleic anhydride | 15.55 kg |
| Piperidine | 52.47 g |
| Toluhydroquinone (THQ) | 3.30 g |

The first stage is carried out at 202° C. until an acid value of 55 milligrams 0.1N potassium hydroxide (KOH) solution per gram of resin and a viscosity (Gardner-Holt 2/1 resin/toluene) of 35 1/100 minutes is reached. The resin is then cooled to 120° C. and the second stage ingredients are loaded:

| Second Stage | |
|---|---|
| Ingredients | Amount |
| 2,6-Di-tert-butyl-4-methylphenol (BHT) | 8.67 g |
| 1,4-benzoquinone (PBQ) | 0.52 g |
| N,N-Dimethylbenzylamine (DMBA) | 34.7 g |

While holding the temperature at 120° C., glycidyl methacrylate (GMA) is pumped into the reactor at a rate of about 30 g/min.:

| Ingredients | Amount |
|---|---|
| Glycidyl Methacrylate | 2,450 g |

After the addition of GMA is complete, the reactants are held at 120° for 30 minutes. The alkyd is thinned to 37% by weight of styrene.

| Finished resin properties: | Value |
|---|---|
| Brookfield Viscosity (LVT/3/30) | 2,216 cps |
| Acid value (mg KOH/g resin) | 17.4 |

EXAMPLE V 192 kg Batch

| First Stage | |
|---|---|
| Ingredients | Amount |
| 2-methyl-1,3-propanediol | 49.15 kg |
| Ethylene glycol | 22.35 kg |
| Phthalic anhydride | 32.00 kg |
| Maleic anhydride | 77.75 kg |
| Piperidine | 262.3 g |

| First Stage | |
|---|---|
| Ingredients | Amount |
| Toluhydroquinone | 16.4 g |

The first stage is carried out at 202° C. until an acid value of 55 milligrams 0.1N potassium hydroxide (KOH) solution per gram of resin and a viscosity (Gardner-Holt 2/1 resin/toluene) of 35 1/100 minutes is reached. The resin is then cooled to 120° C. and the second stage ingredients are loaded:

| Second Stage | |
|---|---|
| Ingredients | Amount |
| 2,6-Di-tert-butyl-4-methylphenol (BHT) | 43.3 g |
| 1,4-benzoquinone (PBQ) | 2.60 g |
| N,N-Dimethylbenzylamine (DMBA) | 173.3 g |

While holding the temperature at 120° C., GMA is pumped into the reactor at about 125 g/min.:

| Ingredients | Amount |
|---|---|
| Glycidyl Methacrylate | 9.93 kg |

After the addition of GMA is complete, the reactants are held at 120° C. for 30 minutes. The alkyd is thinned to 36.4% by weight of styrene.

| Finished resin properties | Value |
|---|---|
| Brookfield Viscosity (LVT/3/30) | 2,336 cps |
| Acid value (mg KOH/g resin) | 17.6 |

EXAMPLE VI

Paste Formulation

The following formulation was found to be useful for generating very black, glossy parts:

| Ingredients | Amount (phr) |
|---|---|
| Resin of Example IV or V | 64.0 |
| Kraton D1118x (35% in styrene) (polybutadiene/polystyrene block copolymer) | 20.3 |
| Plasticolors VS-22399 (pigment) | 7.8 |
| Modiper SV10B (polystyrene/polyvinyl acetate block copolymer) | 7.8 |
| tert-Butyl-perbenzoate (tBPB) | 1.2 |
| Calcium stearate | 5.0 |
| Calwhite II (calcium carbonate) | 108.0 |
| Mag D (magnesium oxide) | 3.0 |

Combining the above gave the following results in molded paste panels (no glass reinforcement):

| Feature | Result |
|---|---|
| Shrinkage (mils/inch) | 1.2 mils/inch expansion |
| Heat distortion temperature (ASTM D 648) | 145° C. |
| Aesthetics: | |
| Pigmentation | Black |
| Gloss | Good |

We claim:

1. A resinous composition for a sheet molding compound, comprising an acrylate-end-capped unsaturated polyester produced by reacting together:

an unsaturated polyester, comprising a polycondensation product of one or more polyhydric alcohols and one or more ethylenically unsaturated polycarboxylic acids; and one or more glycidyl-acrylates represented by formula

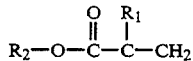

wherein $R_1$, is hydrogen or an alkyl radical having 1 to 5 carbon atoms, and $R_2$ is a glycidyl ester group having the formula

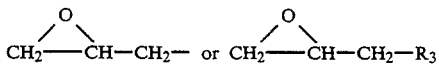

wherein $R_3$ ranges from $C_2H_2O_4$— to $C_{10}H_8O_4$—.

2. The composition of claim 1 wherein $R_1$ is hydrogen or an alkyl radical having 1 to 3 carbon atoms, $R_2$ ranges from $C_3H_5O$— to $C_{13}H_{13}O_5$— and $R_3$ ranges from $C_2H_2O_4$— to $C_{10}H_8O_4$—.

3. The composition of claim 1 wherein $R_1$ is hydrogen or a methyl group and $R_2$ is $C_3H_5O$—.

4. The composition of claim 1 wherein the glycidyl-acrylate is glycidyl methacrylate.

5. The composition of claim 1 wherein the polyhydric alcohol is represented by the formula $R(OH)_x$ wherein R is an alkyl group having 2 to 10 carbon atoms and x is an integer from 2 to 4.

6. The composition of claim 1 wherein the polyhydric alcohol is represented by the formula $R(OH)_2$ wherein R is an alkyl group having 2 to 5 carbon atoms.

7. The composition of claim 1 wherein the polyhydric alcohol is neopentyl glycol, 1,4-cyclohexanedimethanol, 2,2,4-trimethylpantane-1-3-pentanediol, or 2-methyl-3,3-propanediol.

8. The composition of claim 1 wherein the polyhydric alcohol is a combination that includes at least one of neopentyl glycol, 1,4-cyclohexanedimethanol, 2,2,4-trimethylpantane-1-3-pentanediol, or 2-methyl- 1,3-propanediol.

9. The composition of claim 5 wherein the polyhydric alcohol is a combination that includes at least one of neopentyl glycol, 1,4-cyclohexanedimethanol, 2,2,4-trimethylpantane- 1-3-pentanediol, or 2-methyl-1,3-propanediol.

10. The composition of claim 6 wherein the polyhydric alcohol is a combination that includes at least one of neopentyl glycol, 1,4-cyclohexanedimethanol, 2,2,4-trimethylpantane-1-3-pentanediol, or 2-methyl-1,3-propanediol.

11. The composition of claim 1 wherein the polyhydric alcohol is the combination of ethylene glycol and 2-methyl-1,3propanediol.

12. The composition of claim 1 including:

one or more olefinically unsaturated monomers which copolymerizes with the unsaturated polyester.

13. The composition of claim 12 including:

one or more low-profile thermoplastic polymers which cause phase separation and porosity during a curing reaction.

14. The composition of claim 13 including:

one or more compatible components containing polyoxyethane substituents which are compatible with the reacted unsaturated polyester and monomer during cure.

15. A resinous composition for a sheet molding compound, comprising an acrylate-end-capped unsaturated polyester produced by reacting together:

an unsaturated polyester comprising a polycondensation product of 2-methyl-1,3-propanediol, ethylene glycol, phthalic anhydride, and maleic anhydride; and glycidyl methacrylate.

* * * * *